United States Patent
Nagai

(10) Patent No.: US 11,303,708 B2
(45) Date of Patent: Apr. 12, 2022

(54) COMMUNICATION SYSTEM, COMMUNICATION METHOD, DISPLAY DEVICE, AND COMMUNICATION TERMINAL

(71) Applicant: SEIKO EPSON CORPORATION, Tokyo (JP)

(72) Inventor: Kazuki Nagai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 244 days.

(21) Appl. No.: 16/533,890

(22) Filed: Aug. 7, 2019

(65) Prior Publication Data

US 2020/0053164 A1  Feb. 13, 2020

(30) Foreign Application Priority Data

Aug. 8, 2018  (JP) .............................. JP2018-149103

(51) Int. Cl.
| | |
|---|---|
| *H04L 29/08* | (2006.01) |
| *H04L 29/12* | (2006.01) |
| *H04W 4/80* | (2018.01) |
| *H04L 67/141* | (2022.01) |
| *H04L 61/5007* | (2022.01) |

(52) U.S. Cl.
CPC ........ *H04L 67/141* (2013.01); *H04L 61/2007* (2013.01); *H04W 4/80* (2018.02); *G09G 2370/16* (2013.01)

(58) Field of Classification Search
CPC ..... H04L 67/141; H04L 61/2007; H04W 4/80
See application file for complete search history.

(56) References Cited

U.S. PATENT DOCUMENTS

| | | | |
|---|---|---|---|
| 8,640,196 B2* | 1/2014 | Kubota | H04N 5/74 726/2 |
| 2004/0221151 A1* | 11/2004 | Kajita | G06F 13/385 713/2 |

(Continued)

FOREIGN PATENT DOCUMENTS

| | | |
|---|---|---|
| JP | 2003-15831 A | 1/2003 |
| JP | 2003-203023 A | 7/2003 |

(Continued)

OTHER PUBLICATIONS

Martin, Gabriel, "Hipku—encode any IP address as a haiku", Apr. 25, 2017, "https://gabrielbrady.com/projects/hipku/" (Year: 2017).*

*Primary Examiner* — Dhairya A Patel
*Assistant Examiner* — Eui H Kim
(74) *Attorney, Agent, or Firm* — Dority & Manning, P.A.

(57) ABSTRACT

A display control unit causes a projector display unit to display host-specifying information based on a first host address of a first IP address allocated to a projector. A communication establishment unit specifies, when the host-specifying information is inputted via an input unit, a third IP address based on the inputted host-specifying information and a second network address of a second IP address allocated to a communication terminal. The communication establishment unit executes communication establishment processing to establish communication between the projector and the communication terminal, using the third IP address.

7 Claims, 8 Drawing Sheets

(56) References Cited

U.S. PATENT DOCUMENTS

| | | | |
|---|---|---|---|
| 2008/0039063 A1* | 2/2008 | Ichi | H04L 67/04 455/420 |
| 2011/0238798 A1* | 9/2011 | Seki | G06K 15/4045 709/220 |
| 2014/0062675 A1* | 3/2014 | Murata | G08C 17/02 340/12.5 |
| 2015/0138082 A1* | 5/2015 | Nagata | G06F 3/04883 345/157 |
| 2017/0142379 A1* | 5/2017 | Kihara | H04N 9/3179 |
| 2017/0332420 A1* | 11/2017 | Cui | H04W 76/11 |

FOREIGN PATENT DOCUMENTS

| | | |
|---|---|---|
| JP | 2005-57388 A | 3/2005 |
| JP | 2006-20342 A | 1/2006 |
| JP | 2007-316863 A | 12/2007 |
| JP | 2015-148964 A | 8/2015 |

* cited by examiner

[SUBNET MASK]

[IP ADDRESS OF PROJECTOR (FIRST IP ADDRESS)]

[IP ADDRESS OF COMMUNICATION TERMINAL (SECOND IP ADDRESS)]

FIG. 3

| NUMERIC VALUE (0〜65535) | WORD IN NATURAL LANGUAGE |
|---|---|
| 0 | a |
| 1 | it |
| 2 | cat |
| 3 | dog |
| : | : |
| 25701 | we |
| : | : |
| 65535 | fire |

*FIG. 4*

| NUMERIC VALUE (0~255) | WORD IN NATURAL LANGUAGE |
|---|---|
| 0 | a |
| 1 | it |
| 2 | cat |
| 3 | dog |
| : | : |
| 100 | ice |
| 101 | pet |
| : | : |
| 255 | end |

COMMUNICATION SYSTEM, COMMUNICATION METHOD, DISPLAY DEVICE, AND COMMUNICATION TERMINAL

The present application is based on, and claims priority from JP Application Serial Number 2018-149103, filed Aug. 8, 2018, the disclosure of which is hereby incorporated by reference herein in its entirety.

BACKGROUND

1. Technical Field

The present disclosure relates to a communication system, a communication method, a display device, and a communication terminal.

2. Related Art

According to the related art, a method of wirelessly connecting a display device such as a projector and a communication terminal such as a tablet terminal, using a QR code (trademark registered), is proposed. JP-A-2015-148964 is an example of the related art. Specifically, the projector projects a QR code representing information about wireless connection onto a screen, and the tablet terminal picks up an image of the projected QR code and decodes the QR code. The projector and the tablet terminal are wirelessly connected together, using the decoded information.

SUMMARY

An object of the present disclosure is to enable easy establishment of communication connection between a display device and a communication terminal.

An aspect of the present disclosure is directed to a communication system including: a display device which has a display unit and a first communication unit communicating via a communication network and to which a first IP address including a first network address and a first host address is allocated; and a communication terminal which has an input unit and a second communication unit communicating via the communication network and to which a second IP address including a second network address and a second host address is allocated. The display device includes a display control unit causes the display unit to display, host-specifying information based on the first host address. The communication terminal includes a communication establishment unit which executes, when the host-specifying information is inputted via the input unit, communication establishment processing to establish communication between the display device and the communication terminal, using a third IP address specified based on the inputted host-specifying information and the second network address.

In the communication system, the display control unit may cause the display unit to omit displaying information about the first network address, of information about the first network address and the first host address, and cause the display unit to display only the host-specifying information.

In the communication system, the display device may include a host-specifying word conversion unit converting the first host address into a host-specifying word which is a word in a natural language, according to a predetermined first conversion rule. The display control unit may cause the display unit to display the host-specifying word as the host-specifying information. The communication terminal may include a host address acquisition unit which, when the host-specifying word is inputted via the input unit, converts the inputted host-specifying word into the first host address according to the first conversion rule and thereby acquires the first host address. The communication establishment unit may specify the third IP address, based on the first host address acquired by the host address acquisition unit and the second network address.

In the communication system, the first host address may have N bits, N being a natural number equal to or greater than 2. The first conversion rule may be a rule based on a first conversion table establishing a correspondence without an overlap between each numeric value within a range represented by the N bits and a word in a natural language.

In the communication system, the first host address may be formed of a plurality of blocks. The display device may include a host-specifying word string conversion unit converting each block of the first host address into a word in a natural language according to a predetermined second conversion rule and thus converting the first host address into a host-specifying word string which is a word string corresponding to the first host address. The display control unit may cause the display unit to display the host-specifying word string as the host-specifying information. The communication terminal may include a host address acquisition unit which, when the host-specifying word string is inputted via the input unit, converts each word of the inputted host-specifying word string into a corresponding block of the first host address according to the second conversion rule and thereby acquire the first host address. The communication establishment unit may specify the third IP address, based on the first host address acquired by the host address acquisition unit and the second network address.

In the communication system, the first host address may be formed of n blocks, n being a natural number equal to or greater than 2. The first host address may have N bits, N being a natural number equal to or greater than 2. Each block may have N/n bits. The second conversion rule may be a rule based on a second conversion table establishing a correspondence without an overlap between each numeric value within a range represented by the N/n bits and a word in a natural language.

In the communication system, the display control unit may cause the display control unit to display network-specifying information based on the first network address when communication between the display device and the communication terminal is not established within a predetermined time from a time point when the display unit displays the host-specifying information. The communication establishment unit may execute, when the network-specifying information is inputted via the input unit, the communication establishment processing using a fourth IP address specified based on the inputted network-specifying information and the host-specifying information.

Another aspect of the present disclosure is directed to a communication method executed by a display device which has a display unit and a first communication unit communicating via a communication network and to which a first IP address including a first network address and a first host address is allocated, and a communication terminal which has an input unit and a second communication unit communicating via the communication network and to which a second IP address including a second network address and a second host address is allocated. The method includes: a display control step of displaying host-specifying information based on the first host address, on the display unit by the display device; and a communication establishment step of executing by the communication terminal, when the host-specifying information is inputted via the input unit, communication establishment processing to establish communication between the display device and the communication terminal, using a third IP address specified based on the inputted host-specifying information and the second network address.

Still another aspect of the present disclosure is directed to a display device includes a display unit and a first communication unit communicating via a communication network and has a first IP address allocated thereto, the first IP address including a first network address and a first host address. The display device includes a display control unit, the display control unit causes the display unit to omit displaying information about the first network address, of information about the first network address and the first host address included in the first IP address, and the display control unit causes the display unit to display only host-specifying information based on the first host address.

Still another aspect of the present disclosure is directed to a communication terminal having an input unit and a second communication unit communicating via a communication network and has a second IP address allocated thereto, the second IP address including a second network address and a second host address. The communication terminal includes a communication establishment unit which executes, when host-specifying information based on a first host address different from the second host address is inputted via the input unit, communication establishment processing to establish communication using a third IP address specified based on the inputted host-specifying information and the second network address, with another communication terminal to which the third IP address is allocated.

In order to achieve the foregoing object, various other forms may be employed than the foregoing communication system, communication method, display device, and communication terminal. For example, a program of a computer or processor to implement the respective configurations of the foregoing communication system, communication method, display device, and communication terminal may be employed. Also, a recording medium with the program recorded thereon, a server device distributing the program, a transmission medium transmitting the program, a data signal embodying the program in a carrier wave, or the like may be employed.

BRIEF DESCRIPTION OF THE DRAWINGS

FIG. 3 is an explanatory view of a first conversion table.

FIG. 4 is an explanatory view of a second conversion table.

DESCRIPTION OF EXEMPLARY EMBODIMENTS

1. Configuration of Communication System

Figure 1:
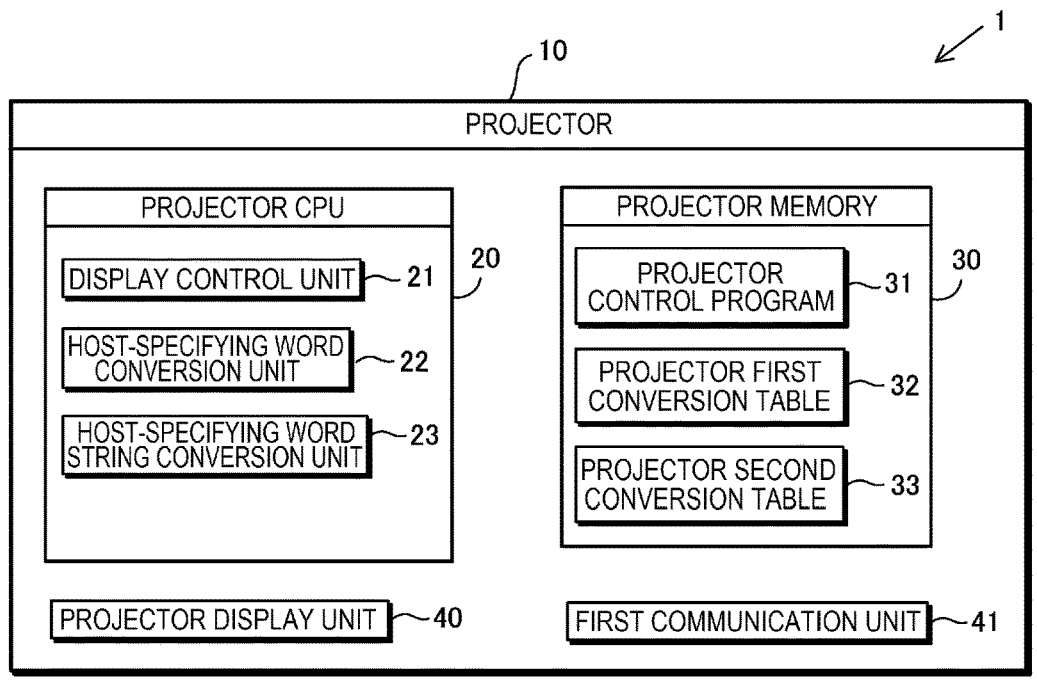
FIG. 1 shows the configuration of a communication system.
Figure 1:
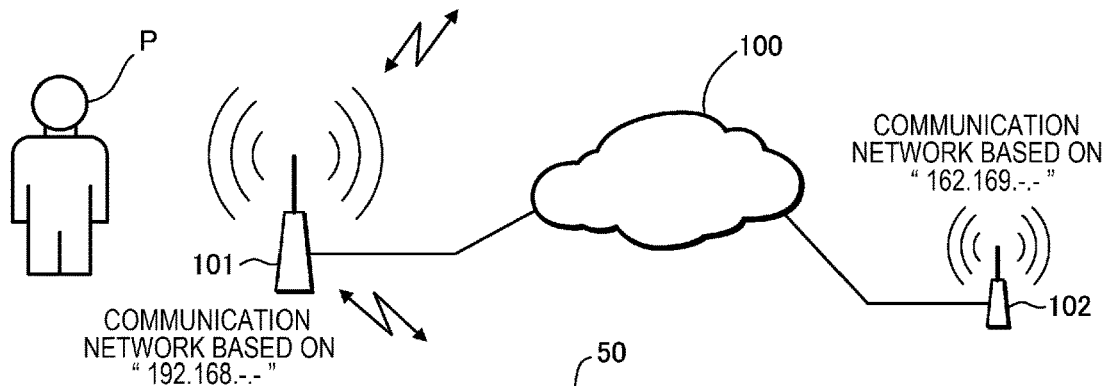
Figure 1:
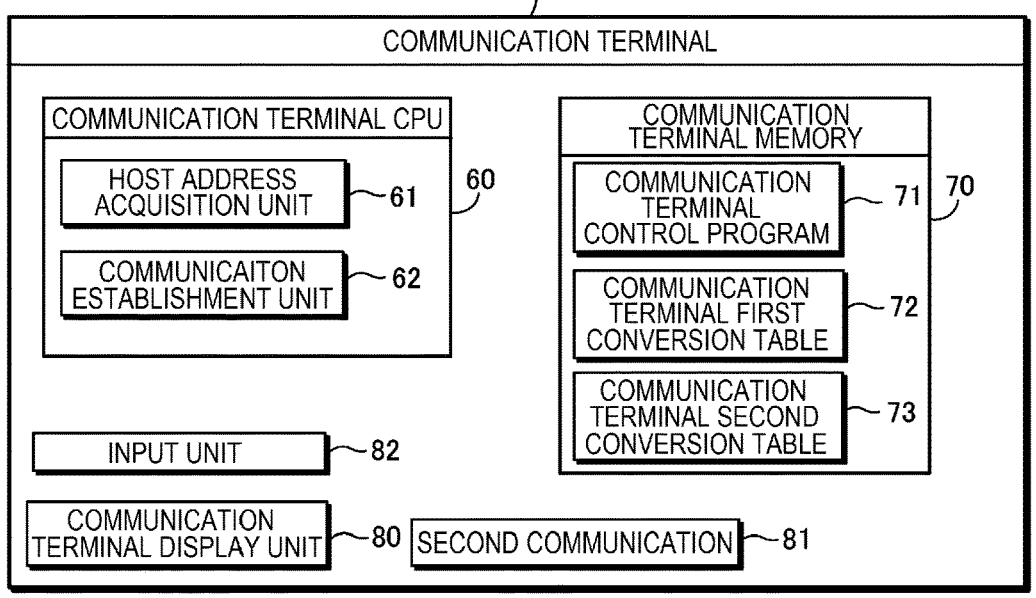

FIG. 1 shows the configuration of a communication system 1 in an embodiment to which the present disclosure is applied. The communication system 1 includes a projector 10 equivalent to the display device according to the present disclosure, and a communication terminal 50. The communication terminal 50 is, for example, a PC (personal computer), tablet terminal, smartphone or the like.

The projector 10 and the communication terminal 50 have a communication function based on wireless LAN (local area network) such as Wi-Fi (trademark registered). The projector 10 and the communication terminal 50 wirelessly communicate with a host of a communication destination via a first AP (access point) 101 and a second AP 102 or the like. The first AP 101 and the second AP 102 are connected to a wide-area communication network 100 such as the internet.

Figure 2:
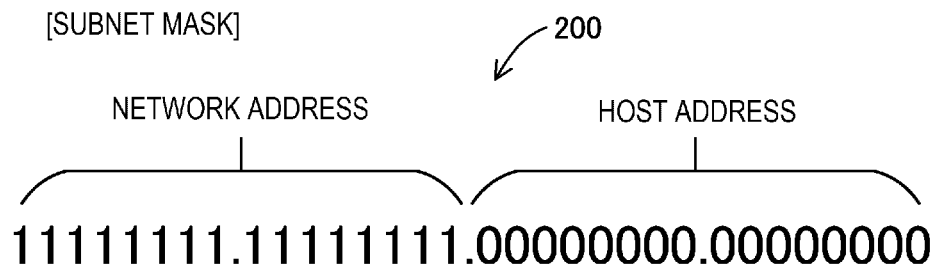
FIG. 2 is an explanatory view of IP addresses allocated to a projector and a communication terminal.
Figure 2:
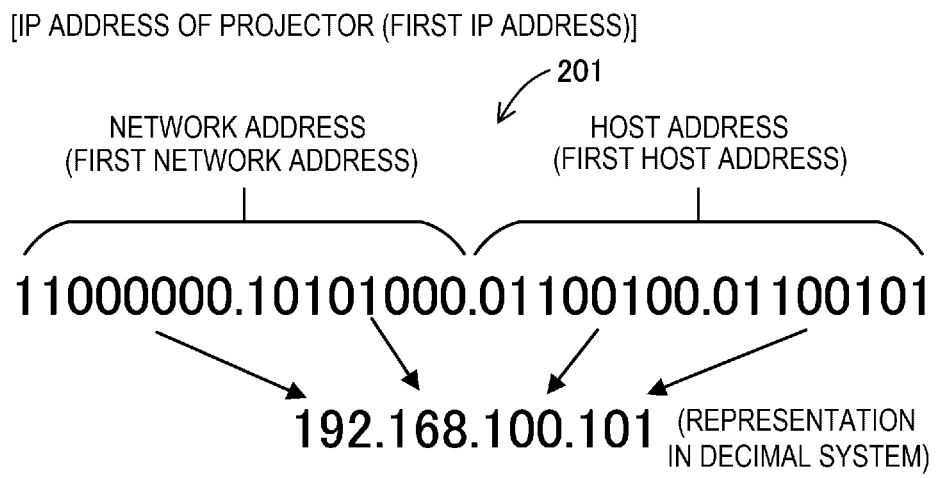
Figure 2:
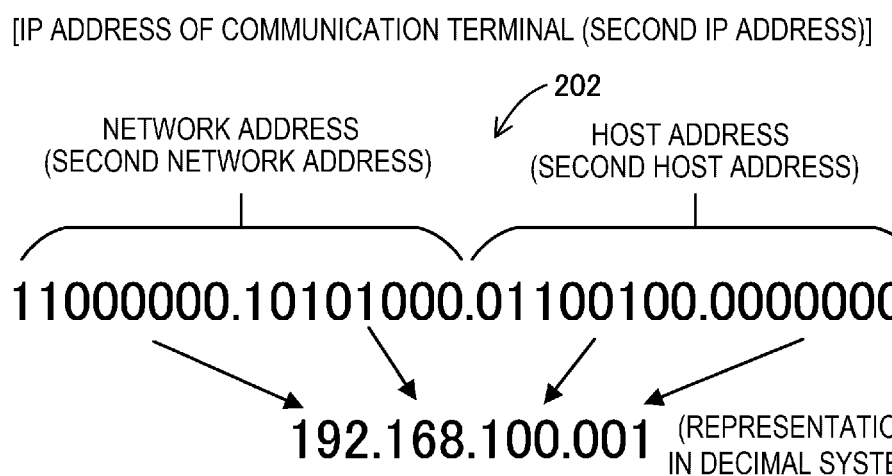

In this embodiment, the first AP 101 and the second AP 102 employ a class-B network, based on a subnet mask 200 shown in FIG. 2. In the subnet mask 200, a network address is allocated to higher 16 bits of a 32-bit IP (Internet Protocol) address, and a host address is allocated to lower 16 bits. Here, 16 is equivalent to N which is a natural number equal to or greater than 2 according to the present disclosure.

As shown in FIG. 1, the first AP 101 forms a communication network based on an IP address of "192.168.-.-". The second AP 102 forms a communication network based on an IP address of "192.169.-.-". In this embodiment, a first IP address 201 is allocated as the IP address of the projector 10, as shown in FIG. 2. A first network address, which is the network address of the first IP address 201, is "192.168". A first host address, which is the host address of the first IP address 201, is "100.101".

A second IP address 202 is allocated as the IP address of the communication terminal 50. A second network address, which is the network address of the second IP address 202, is "192.168". A second host address, which is the host address of the second IP address 202, is "100.001".

The projector 10 has a projector CPU (central processing unit) 20, a projector memory 30, a projector display unit 40, and a first communication unit 41 or the like. The projector display unit 40 projects an image onto a screen (not illustrated). The first communication unit 41 communicates via a wireless LAN. The projector display unit 40 is equivalent to the display unit according to the present disclosure.

In the projector memory 30, data of a projector control program 31, a projector first conversion table 32, and a projector second conversion table 33 are saved.

The projector first conversion table 32 is a conversion table establishing a correspondence without an overlap between a numeric value of 0 to 65535 within a range of 16 bits and a word in English, which is a natural language, as shown in FIG. 3. The conversion rule based on the projector first conversion table 32 is equivalent to the first conversion rule according to the present disclosure. The projector second conversion table 33 is a conversion table establishing a correspondence without an overlap between a numeric value of 0 to 255 within a range of 8 bits and a word in English, which is a natural language, as shown in FIG. 4. The conversion rule based on the projector second conversion table 33 is equivalent to the second conversion rule according to the present disclosure.

The projector CPU 20 reads and executes the projector control program 31 saved in the projector memory 30 and thus functions as a display control unit 21, a host-specifying word conversion unit 22, and a host-specifying word string conversion unit 23. The processing by the display control unit 21 is equivalent to the display control step in the communication method according to the present disclosure. The projector CPU 20 may be formed of one or a plurality of processors.

The host-specifying word conversion unit 22 converts the first host address of the first IP address 201 allocated to the projector 10 into a corresponding word via the projector first conversion table 32. In this embodiment, the host-specifying word conversion unit 22 converts the first host address "100.101" into a host-specifying word "we".

The host-specifying word string conversion unit 23 converts the first host address and the first network address of the first IP address 201 allocated to the projector 10 into a corresponding word on an 8-bit basis via the projector second conversion table 33. The 8-bit basis is equivalent to each block of the address according to the present disclosure. The number of words separated by 8 bits is equivalent to n which is a natural number equal to or greater than 2 according to the present disclosure. Thus, the host-specifying word string conversion unit 23 converts the first IP address 201 into a word string made up of four words representing the first IP address 201, converts the first network address into a word string made up of two words representing the first network address, or converts the first host address into a word string made up of two words representing the first host address. In this embodiment, the host-specifying word string conversion unit 23 converts the first host address "100.101" into a host-specifying word string "ice.pet".

The display control unit 21 causes the projector display unit 40 to project and display, on the screen, the host-specifying word acquired by the conversion by host-specifying word conversion unit 22 and the host-specifying word string acquired by the conversion by the host-specifying word string conversion unit 23.

The communication terminal 50 has a communication terminal CPU 60, a communication terminal memory 70, a communication terminal display unit 80, a second communication unit 81, and an input unit 82. The communication terminal display unit 80 displays the operating state or the like of the communication terminal 50. The second communication unit 81 communicates via a wireless LAN. The input unit 82 inputs information in response to an operation by a user P. As the input unit 82, a keyboard, touch panel, mouse or the like is employed. Also, a configuration to recognize a voice of the user P inputted via a microphone may be employed as the input unit 82.

In the communication terminal memory 70, data of a communication terminal control program 71, a communication terminal first conversion table 72, and a communication terminal second conversion table 73 are saved. The configuration of the communication terminal first conversion table 72 is similar to that of the projector first conversion table 32 described above with reference to FIG. 3. The configuration of the communication terminal second conversion table 73 is similar to that of the projector second conversion table 33 described above with reference to FIG. 4.

The communication terminal CPU 60 reads and executes the communication terminal control program 71 saved in the communication terminal memory 70 and thus functions as a host address acquisition unit 61 and a communication establishment unit 62. The processing by the communication establishment unit 62 is equivalent to the communication establishment step in the communication method according to the present disclosure. The communication terminal CPU 60 may be formed of one or a plurality of processors.

The host address acquisition unit 61 converts a host-specifying word inputted by an operation on the input unit 82 by the user P into a numeric value via the communication terminal first conversion table 72 and thereby acquires the first host address of the projector 10 as a communication counterpart. In this embodiment, when "we" is inputted as a host-specifying word, the host address acquisition unit 61 converts the host-specifying word "we" into a numeric value "25701" via the communication terminal first conversion table 72.

The host address acquisition unit 61 also converts a host-specifying word string inputted by an operation on the input unit 82 by the user P into a numeric value via the communication terminal second conversion table 73. The host address acquisition unit 61 thus acquires the first IP address 201 of the projector 10 as a communication counterpart, the first host address of the first IP address 201, or the first network address of the first IP address 201. In this embodiment, when "ice.pet" is inputted as a host-specifying word string, the host address acquisition unit 61 converts the host-specifying word string "ice.pet" into a numeric string "100.101" via the communication terminal second conversion table 73.

The communication establishment unit 62 assumes that both of the communication terminal 50 and the projector 10 belong to a network formed by the first AP 101 and that the network address of the IP addresses of the communication terminal 50 and the projector 10 are the same. On this assumption, the communication establishment unit 62 executes communication establishment processing to establish communication between the projector 10 and the communication terminal 50. That is, the communication establishment unit 62 assumes that the first network address of the first IP address 201 allocated to the projector 10 and the second network address of the second IP address 202 allocated to the communication terminal 50 are the same.

The communication establishment unit 62 specifies a third IP address formed by the second network address and the host address acquired by the host address acquisition unit 61, as the IP address of the projector 10. The communication establishment unit 62 executes communication establishment processing with the projector 10, using the third IP address. In this case, when the first network address of the projector 10 is the same as the second network address of the communication terminal 50, communication between the communication terminal 50 and the projector 10 can be established. That is, the user can easily establish communication between the projector 10 and the communication terminal 50, simply by inputting the first host address. Also, communication between the projector 10 and the communication terminal 50 can be easily established without separately providing a DNS (domain name system) server to convert a character string such as a domain name into an IP address.

Meanwhile, when the first network address of the projector 10 and the second network address of the communication terminal 50 are different from each other, communication between the communication terminal 50 and the projector 10 cannot be established based on the third IP address. In this case, the display control unit 21 causes the projector display unit 40 to project and display, on the screen, network-specifying information based on the first network address of the first IP address 201 allocated to the projector 10.

The user P viewing this display inputs the network-specifying information via the input unit 82. This enables the communication establishment unit 62 to recognize the first network address of the projector 10. By recognizing the first network address of the projector 10, the communication establishment unit 62 specifies a fourth IP address formed of the first network address and the first host address. The communication establishment unit 62 can then establish communication between the communication terminal 50 and the projector 10, using the fourth IP address.

Figure 5:
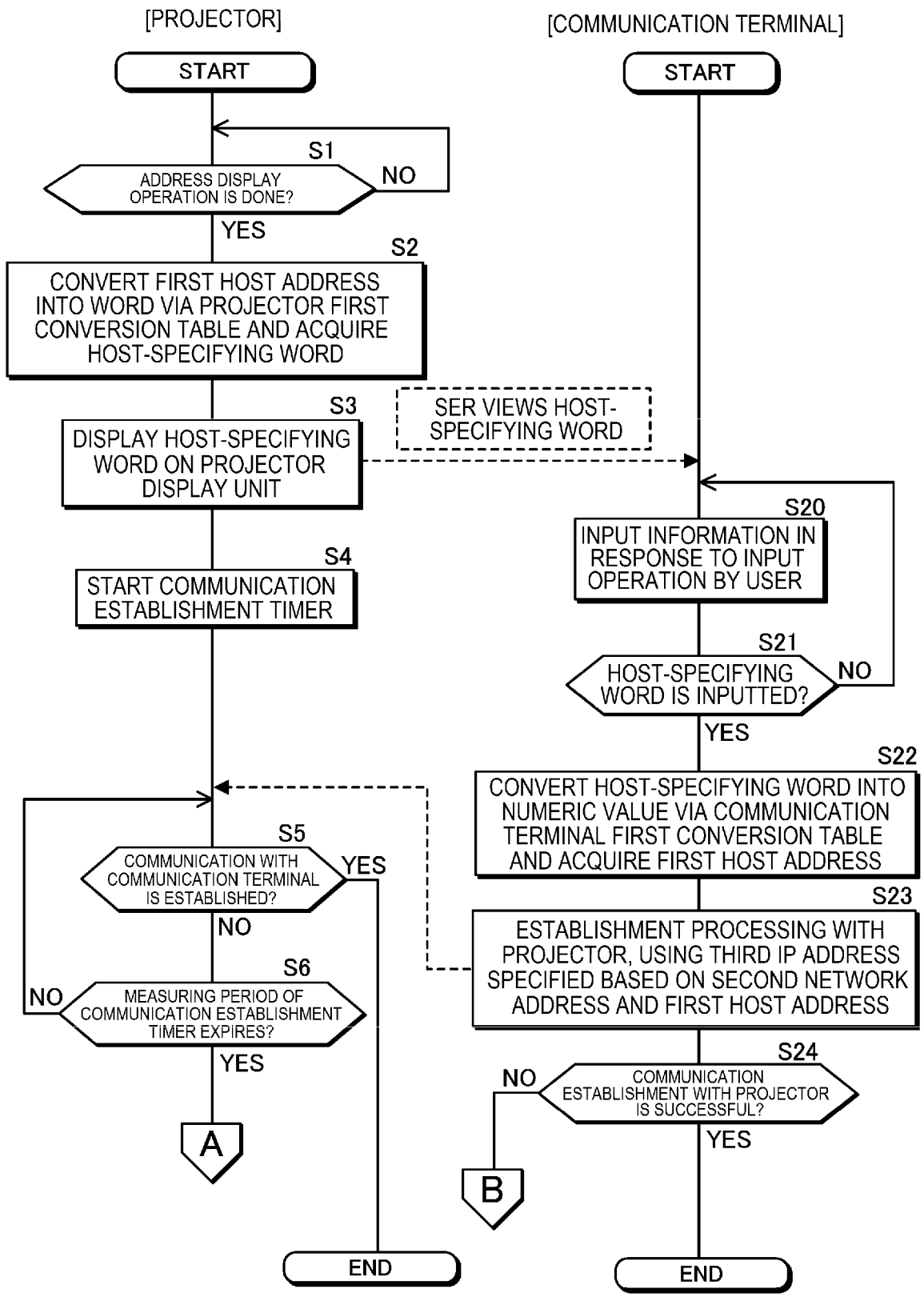
FIG. 5 is a flowchart of a processing sequence to establish communication between the projector and the communication terminal.
Figure 6:
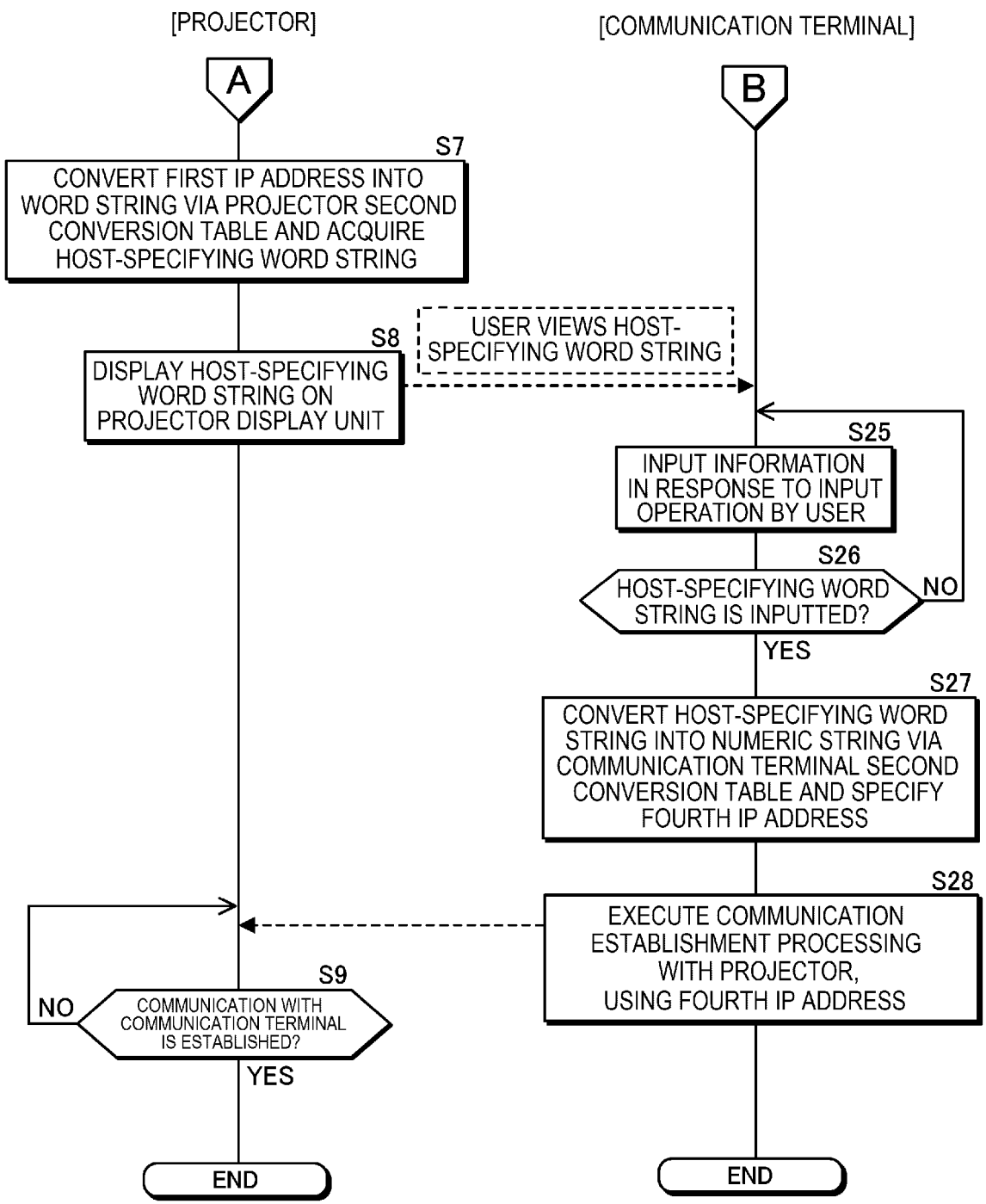
FIG. 6 is a flowchart of processing when the network addresses of the IP addresses allocated to the projector and the communication terminal are different from each other.

2. Communication Establishment Processing Between Projector and Communication Terminal Next, the communication establishment processing to establish communication between the projector 10 and the communication terminal 50 will be described with reference to the flowcharts shown in FIGS. 5 and 6. FIG. 5 is a flowchart of a processing sequence to establish communication between the projector 10 and the communication terminal 50. FIG. 6 is a flowchart of processing when the network addresses of the IP addresses allocated to the projector 10 and the communication terminal 50 are different from each other.

In step S1 in FIG. 5, the host-specifying word conversion unit 22 of the projector 10 shifts the processing to step S2 when an address display operation is done by the user P. The address display operation includes a power-ON operation, an operation on a startup switch, not illustrated, or the like. In step S2, the host-specifying word conversion unit 22 converts the first host address "25701 (100.101)" of the first IP address 201 allocated to the projector 10 into the host-specifying word "we" via the projector first conversion table 32.

In the subsequent step S3, the display control unit 21 causes the projector display unit 40 to project and display only the host-specifying word "we" on the screen, omitting displaying information about the first network address of the first IP address 201. The user P can input the word "we" instead of the host address. Also, since the network address need not be inputted, the user P can easily carry out the input and can expect a reduction in input error. In the subsequent step S4, the display control unit 21 starts a communication establishment timer at the time point when the display of the host-specifying word "we" is started. The measuring period of the communication establishing timer is set to a predetermined time period such as several minutes.

In a loop of the subsequent steps S5 and S6, the display control unit 21 repeatedly determines in step S5 whether communication with the communication terminal 50 is established or not, until the measuring period of the communication establishment timer expires in step S6. When a connection request message sent from the communication terminal 50 is received, the display control unit 21 determines that connection with the communication terminal 50 is established. When communication with the communication terminal 50 is established, the display control unit 21 ends the processing sequence.

Meanwhile, when the measuring period of the communication establishment timer expires in step S6 before communication with the communication terminal 50 is established in step S5, the display control unit 21 shifts the processing to step S7 in FIG. 6.

The host address acquisition unit 61 of the communication terminal 50, in step S20 in FIG. 5, inputs information in response to an operation on the input unit 82 by the user P, and in the subsequent step S21, determines whether a host-specifying word is inputted or not. Here, when the host-specifying word "we" of the projector 10 is inputted, the host address acquisition unit 61 shifts the processing to step S22.

In step S22, the host address acquisition unit 61 converts the host-specifying word "we" into a numeric value via the communication terminal first conversion table 72 and acquires the first host address "25701 (100.101)" of the projector 10. In the subsequent step S23, the communication establishment unit 62 assumes that the first network address of the first IP address 201 of the projector 10 is the same as the second network address of the second IP address 202 of the communication terminal 50. The communication establishment unit 62 then regards the third IP address formed of the second network address and the first host address as the IP address of the projector 10 and executes the communication establishment processing to establish communication with the projector 10. Specifically, the communication establishment unit 62 sends a connection request message defining the third IP address as the destination and defining the second IP address 202 as the source, via the second communication unit 81.

In the subsequent step S24, the communication establishment unit 62 determines whether the communication establishment between the projector 10 and the communication terminal 50 is successful or not. When receiving a connection permission message defining the second IP address 202 as the destination and the third IP address as the source, the communication establishment unit 62 determines that the communication establishment between the projector 10 and the communication terminal 50 is successful. When the communication establishment is successful, the communication establishment unit 62 ends the processing sequence. In this embodiment, the first network address of the first IP address 201 allocated to the projector 10 and the second network address of the second IP address 202 allocated to the communication terminal 50 are the same, as shown in FIG. 2. Therefore, it is determined in step S24 that the communication establishment between the projector 10 and the communication terminal 50 is successful, and then the processing ends.

Meanwhile, for example, when the communication terminal 50 belongs to a network formed by the second AP 102 shown in FIG. 1 and the network address of the second IP address allocated thereto is "192.169", communication cannot be established by the processing of step S23. In this case, the communication establishment unit 62 shifts the processing to step S25 in FIG. 6.

Figure 7:
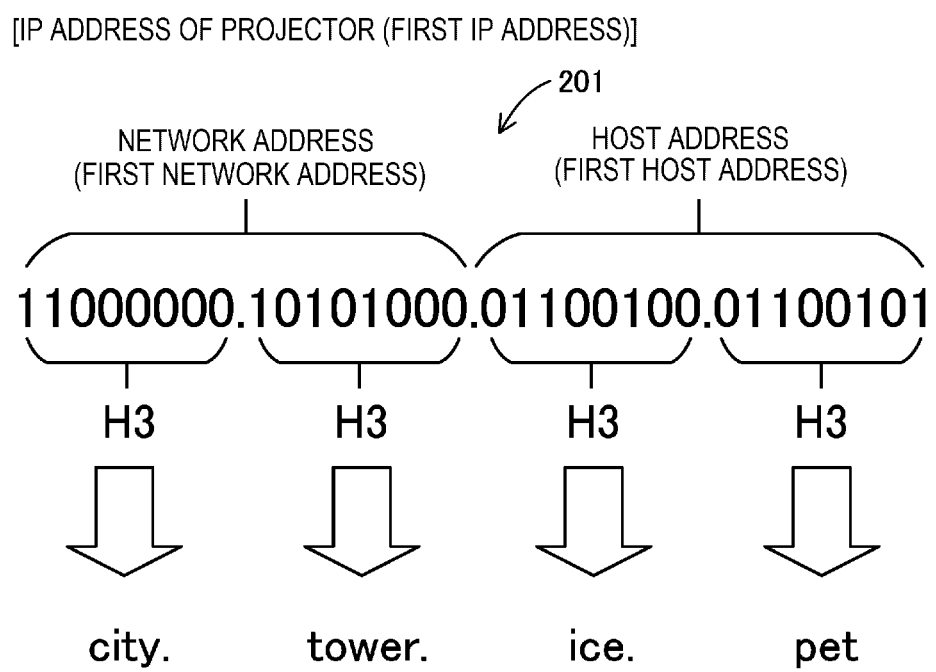
FIG. 7 is an explanatory view of processing to convert the IP address of the projector into a word string.

In step S7 in FIG. 6, the host-specifying word string conversion unit 23 of the projector 10 converts the first IP address 201 allocated to the projector 10 into a word on an 8-bit basis via the projector second conversion table 33. The host-specifying word string conversion unit 23 thus converts the first IP address into a host-specifying word string representing the first IP address. In this embodiment, the host-specifying word string conversion unit 23 converts the first IP address "192.168.100.101" into a host-specifying word string "city.tower.ice.pet", as shown in FIG. 7.

In the subsequent step S8, the display control unit 21 causes the projector display unit 40 to project and display the host-specifying word string on the screen. Then, the display control unit 21 ends the processing when communication establishment with the communication terminal 50 is confirmed in the subsequent step S9.

The host address acquisition unit 61 of the communication terminal 50, in step S25, input information response to an operation on the input unit 82 by the user P, and in the subsequent step S26, determines whether a host-specifying word string is inputted or not. Here, when the host-specifying word string "city.tower.ice.pet" of the projector 10 is inputted, the host address acquisition unit 61 shifts the processing to step S27.

In step S27, the host address acquisition unit 61 converts the host-specifying word string "city.tower.ice.pet" into a numeric string of every 8 bits via the communication terminal second conversion table 73 and specifies a fourth IP address "192.168.100.101". In the subsequent step S28, the communication establishment unit 62 executes the communication establishment processing between the projector 10 and the communication terminal 50, using the fourth IP address "192.168.100.101".

3. Other Embodiments

Figure 8:
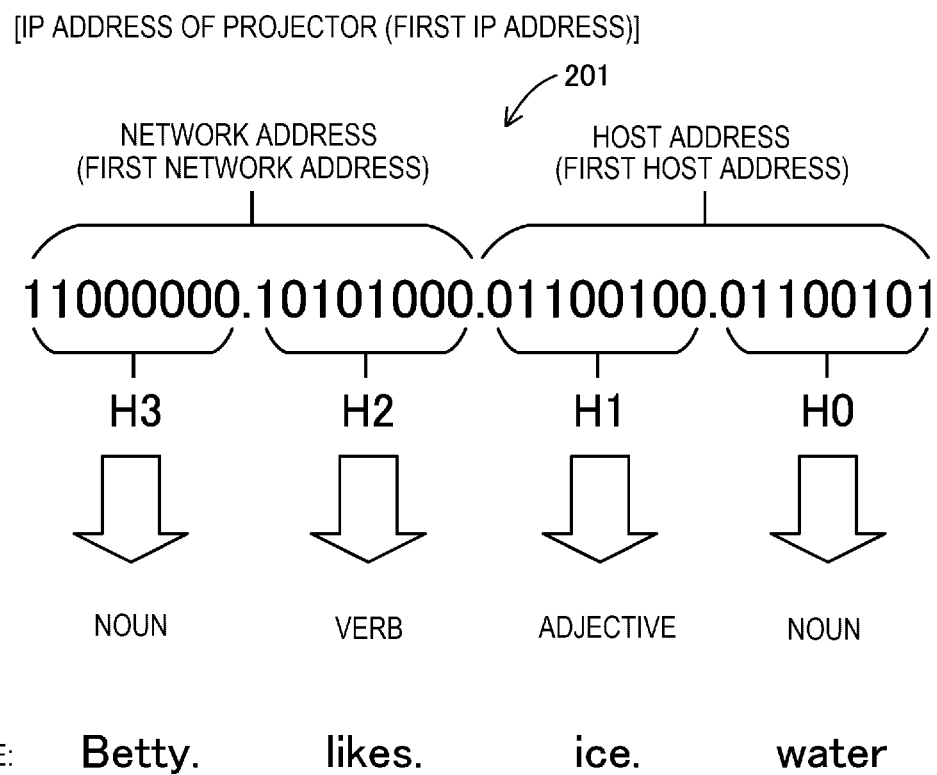
FIG. 8 is an explanatory view of processing to convert the IP address of the projector into a word string as a sentence.

In the embodiment, the host-specifying word string conversion unit 23 converts an IP address into a word string on an 8-bit basis and thus acquires a host-specifying word string, as shown in FIG. 7. However, a word of a preset part of speech may be allocated to each 8-bit unit, as shown in FIG. 8. Such a configuration causes the acquired host-specifying word string to be a sentence with a meaning and therefore enables the user to input the host-specifying word string more easily.

In the embodiment, the host-specifying word conversion unit 22 or the host-specifying word string conversion unit 23 converts the first host address of the projector 10 into a word or word string, and the resulting word or word string is displayed. However, the numeric value of the first host address may be displayed as it is. That is, the host-specifying information may be a numeric value representing the host address. Even in this case, the user can simply input the first host address of the first IP address and need not input the first network address. Therefore, the user can easily establish communication between the projector 10 and the communication terminal 50.

In the embodiment, when communication between the projector 10 and the communication terminal 50 fails, the processing to display the network address of the projector 10 is carried out, based on the processing in the flowchart shown in FIG. 6. As another configuration, the effect of the present disclosure can be achieved even when this processing is omitted.

In the embodiment, the projector 10 is described as an example of the display device according to the present disclosure. However, the present disclosure can be applied to any display device having a display unit which the user can view.

In the embodiment, the display control unit 21, in step S2 in FIG. 5, converts the first host address into a word via the projector first conversion table 32 and acquires a host-specifying word. As another configuration, the first host address may be converted into a word string via the projector second conversion table 33 and a host-specifying word string may be acquired. In this case, in step S22, the host address acquisition unit 61 converts the host-specifying word string into a numeric string via the communication terminal second conversion table 73 and acquires the first host address.

In the embodiment, the processing about an IP address having 32 bits as the N bits according to the present disclosure is described as an example. However, N may be any natural number equal to or greater than 2. For example, processing about an IP address having a greater N, such as an IP address having 128 bits, may be carried out. Also, while the processing where an IP address is divided into four blocks with n according to the present disclosure being 4 is described as an example, n may be any natural number equal to or greater than 2 and an IP address may be divided into a larger number of blocks.

In the embodiment, a word and a word string in English is employed as the host-specifying word and the host-specifying word string. However, another natural language may be employed. In this case, the natural language employed for the host-specifying word and the host-specifying word string may be decided according to the country, region or the like where the projector 10 and the communication terminal 50 are used.

In the embodiment, in step S3 in FIG. 5, the display control unit 21 omits the display about the first network address, of the first network address and the first host address included in the first IP address 201 of the projector 10. The display control unit 21 causes the projector display unit 40 to display only the host-specifying word, which is the host-specifying information based on the first host address. As another embodiment, both information about the first network address and the host-specifying information may be displayed. In this case, the display control unit 21 causes the projector display unit 40 to display the information about the first network address and the host-specifying information in such a way that the user can distinguish these when viewing. The display control unit 21 also prompts the user to input the host-specifying information in the display by the projector display unit 40 and indicates that the information about the first network address need not be inputted. This causes the user to input only the viewed host-specifying information via the input unit 82 and thus enables the user to easily establish communication between the projector 10 and the communication terminal 50.

At least a part of the functional blocks shown in FIG. 1 may be implemented by hardware or may be implemented by a collaboration of hardware and software. The functional blocks are not limited to a configuration where separate hardware recourses are arranged as illustrated. The programs executed by the projector CPU 20 and the communication terminal CPU 60 are not limited to being stored in the projector memory 30 and the communication terminal memory 70 and may be stored in a storage device formed as a separate unit from the projector 10 and the communication terminal 50. Also, the projector CPU 20 or the communication terminal CPU 60 may acquire and execute a program stored in an external device. Moreover, the specific detailed configuration of each of the other parts of the device forming the projector 10 or the communication terminal 50 can be arbitrarily changed without departing from the scope and spirit of the present disclosure.

What is claimed is:

1. A communication system comprising:
   a display device which has a display unit and a first transceiver communicating via a communication network and to which a first IP address including a first network address and a first host address is allocated; and
   a communication terminal which has an input unit and a second transceiver communicating via the communication network and to which a second IP address including a second network address and a second host address is allocated, wherein the display device includes one or more first processors programmed to cause the display unit to display first host-specifying information based on the first host address, and wherein the first host-specifying information is a one or more first words in a natural language, and wherein the one or more first processors is further programmed to cause, after a fixed period of time, the display unit to display a second host-specifying information based on the first host address and the first network address, wherein the second host-specifying information is a one or more second words in a natural language, and wherein the one or more second words in a natural language are different from the one or more first words in a natural language, the communication terminal includes one or more second processors which are programmed to cause, when the host-specifying information is inputted via the input unit, communication establishment processing to establish communication between the display device and the communication terminal, using a third IP address specified based on the inputted host-specifying information and the second network address, the one or more first processors are further programmed to cause converting the first host address into a host-specifying word which is a word in a natural language, according to a predetermined first conversion rule, and are further programmed to cause the display unit to display the host-specifying word as the host-specifying information, and the one or more second processors are further programmed to cause, when the host-specifying word is inputted via the input unit, converting the inputted host-specifying word into the first host address according to the first conversion rule and thereby acquiring the first host address, and are further programmed to cause specifying the third IP address, based on the first host address acquired by the one or more second processors and the second network address.

2. The communication system according to claim 1, wherein the one or more first processors are further programmed to cause the display unit to omit displaying information about the first network address, of information about the first network address and the first host address, and to cause the display unit to display only the host-specifying information.

3. The communication system according to claim 1, wherein the first host address has N bits, N being a natural number equal to or greater than 2, and the first conversion rule is a rule based on a first conversion table establishing a correspondence without an overlap between each numeric value within a range represented by the N bits and a word in a natural language.

4. The communication system according to claim 1, wherein the first host address is formed of a plurality of blocks, the one or more first processors are further programmed to cause converting each block of the first host address into a word in a natural language according to a predetermined second conversion rule and thus converting the first host address into a host-specifying word string which is a word string corresponding to the first host address, and are further programmed to cause the display unit to display the host-specifying word string as the host-specifying information, the one or more second processors are further programmed to cause, when the host-specifying word string is inputted via the input unit, converting each word of the host-specifying word string into a corresponding block of the first host address according to the second conversion rule and thereby acquiring the first host address, and are further programmed to cause specifying the third IP address, based on the first host address acquired by the one or more second processors and the second network address.

5. The communication system according to claim 4, wherein the first host address is formed of n blocks, n being a natural number equal to or greater than 2, the first host address has N bits, N being a natural number equal to or greater than 2, and each block has N/n bits, and the second conversion rule is a rule based on a second conversion table establishing a correspondence without an overlap between each numeric value within a range represented by the N/n bits and a word in a natural language.

6. The communication system according to claim 1, wherein the one or more first processors are further programmed to cause the display unit to display network-specifying information based on the first network address when communication between the display device and the communication terminal is not established within a predetermined time from a time point when the display unit displays host-specifying information, and the one or more second processors are further programmed to cause, when the network-specifying information is inputted via the input unit, the communication establishment processing using a fourth IP address specified based on the inputted network-specifying information and the host-specifying information.

7. A communication method executed by a display device which has a display unit and a first transceiver communicating via a communication network and to which a first IP address including a first network address and a first host address is allocated, and a communication terminal which has an input unit and a second transceiver communicating via the communication network and to which a second IP address including a second network address and a second host address is allocated, the method comprising:

displaying first host-specifying information based on the first host address, on the display unit by the display device, and wherein the first host-specifying information is a one or more first words in a natural language, and after a fixed period of time, displaying on the display unit by the display device a second host-specifying information based on the first host address and the first network address, wherein the second host-specifying information is a one or more second words in a natural language, and wherein the one or more second words in a natural language are different from the one or more first words in a natural language;

executing by the communication terminal, when the host-specifying information is inputted via the input unit, communication establishment processing to establish communication between the display device and the communication terminal, using a third IP address specified based on the inputted host-specifying information and the second network address;

converting the first host address into a host-specifying word which is a word in a natural language, according to a predetermined first conversion rule, and displaying the host-specifying word as the host-specifying information, and when the host-specifying word is inputted via the input unit, converting the inputted host-specifying word into the first host address according to the first conversion rule and thereby acquiring the first host address, and specifying the third IP address, based on the first host address acquired by the second network address.

\* \* \* \* \*